United States Patent
Jiang et al.

(10) Patent No.: US 7,106,762 B1
(45) Date of Patent: Sep. 12, 2006

(54) SINGLE-FREQUENCY NARROW LINEWIDTH 2 μM FIBER LASER

(75) Inventors: Shibin Jiang, Tucson, AZ (US); Christine Spiegelberg, Tucson, AZ (US); Tao Luo, Tucson, AZ (US)

(73) Assignee: NP Photonics, INC, Tucson, AZ (US)

( * ) Notice: Subject to any disclaimer, the term of this patent is extended or adjusted under 35 U.S.C. 154(b) by 310 days.

(21) Appl. No.: 10/783,480

(22) Filed: Feb. 19, 2004

Related U.S. Application Data

(63) Continuation-in-part of application No. 10/056,830, filed on Jan. 24, 2002, now Pat. No. 6,816,514.

(51) Int. Cl.
*H01S 3/30* (2006.01)

(52) U.S. Cl. .............. 372/6; 372/102; 372/32
(58) Field of Classification Search .......... 372/6, 372/32, 96, 102
See application file for complete search history.

(56) References Cited

U.S. PATENT DOCUMENTS

| | | | |
|---|---|---|---|
| 4,578,793 A | 3/1986 | Kane et al. | |
| 4,964,131 A | 10/1990 | Liu et al. | |
| 4,967,416 A | 10/1990 | Esterowitz et al. | |
| 5,042,039 A | 8/1991 | Edagawa et al. | |
| 5,043,996 A | 8/1991 | Nilsson et al. | |
| 5,291,501 A | 3/1994 | Hanna | |
| 5,406,410 A | 4/1995 | Hanna et al. | |
| 5,448,579 A | 9/1995 | Chang et al. | |
| 5,457,706 A | 10/1995 | McGuckin et al. | |
| 5,511,083 A | 4/1996 | D'Amato et al. | |
| 5,594,747 A | 1/1997 | Ball | |
| 5,617,244 A | 4/1997 | Percival et al. | |
| 5,843,073 A | 12/1998 | Sinofsky | |
| 5,892,781 A | 4/1999 | Pan et al. | |
| 5,905,745 A * | 5/1999 | Grubb et al. | 372/6 |
| 5,991,314 A * | 11/1999 | Ionov et al. | 372/6 |
| 6,002,704 A | 12/1999 | Freitag et al. | |
| 6,018,534 A * | 1/2000 | Pan et al. | 372/6 |
| 6,031,850 A | 2/2000 | Cheo | |
| 6,041,069 A | 3/2000 | Kashyap et al. | |
| 6,320,885 B1 | 11/2001 | Kawai et al. | |
| 6,463,083 B1 | 10/2002 | Sumiyoshi et al. | |
| 6,476,960 B1 | 11/2002 | Traynor et al. | |

(Continued)

OTHER PUBLICATIONS

C. Ghisler et al., Tuning of a Tm3+:Ho3+:Silica Fiber Laser at 2 um, IEEE Journal fo Quantum Electronics, vol. 31, No. 11, Nov. 1995, pp. 1877-1879.

(Continued)

*Primary Examiner*—Minsun Oh Harvey
*Assistant Examiner*—Tuan Nguyen
(74) *Attorney, Agent, or Firm*—Eric A. Gifford

(57) ABSTRACT

A compact single frequency, single-mode 2 μm fiber laser with narrow linewidth, <100 kHz and preferably <100 kHz, is formed with a low phonon energy glass doped with triply ionized rare-earth thulium and/or holmium oxide and fiber gratings formed in sections of passive silica fiber and fused thereto. Formation of the gratings in passive silica fiber both facilitates splicing to other optical components and reduces noise thus improving linewidth. An increased doping concentration of 0.5 to 15 wt. % for thulium, holmium or mixtures thereof produces adequate gain, hence output power levels for fiber lengths less than 5 cm and preferably less than 3 cm to enable single-frequency operation.

27 Claims, 4 Drawing Sheets

U.S. PATENT DOCUMENTS

| | | |
|---|---|---|
| 6,510,167 B1 * | 1/2003 | Jain et al. .................. 372/6 |
| 6,567,432 B1 | 5/2003 | Kim et al. |
| 6,570,893 B1 | 5/2003 | Libatique et al. |
| 6,603,779 B1 | 8/2003 | Pedersen et al. |

OTHER PUBLICATIONS

J.Y. Allain et al., Tuable CW Lasing Around 0-82, 1-48, 1-88 and 2.35 um In Thulium-Doped Fluorozirconate Fibre, Electronics Letters, Nov. 23, 1989, vol. 25, No. 24, pp. 1660-1662.

W.A. Clarkson et al., High-power cladding-pumped Tm-doped silica fiber laser with a wavelength tuning from 1860 to 2090 nm, Optics Letters, Nov. 15, 2002, vol. 27, No. 22, pp. 1989-1991.

Struart D. Jackson et al., High-power diode-cladding-pumped Tm-doped silica fiber laser, Optics Letters, Sep. 15, 1998, vol. 23, No. 18, pp. 1462-1464.

Ashraf F. El-Sherif et al., High-peak-power operation of a Q-switched Tm3+-doped silica fiber laser operating near 2um, Optics Letters, Jan. 1, 2003, vol. 28, No. 1, pp. 22-24.

R.A. Hayward et al., Efficient cladding-pumped Tm-doped silica fibre laser with high power singlemode output at 2um, Electronics Letters, Apr. 13, 2000, vol. 36, No. 8, pp. 711-712.

Stuart D. Jackson et al., Dynamics of the output of heavily Tm-doped double-clad silica fiber lasers, J. Opt. Soc. Am., Dec. 1999, vol. 16, No. 12, pp. 2178-2188.

Stuart D. Jackson et al., CW Operation of a 1.064-um Pumped Tm-Ho-Doped Silica Fiber Laser, IEEE Journal of Quantum Electronics, Sep. 1998, vol. 34, No. 9, pp. 1578-1587.

R.C. Sharp et al., 190-fs passively mode-locked thulium fiber laser with a low threshold, Optics Letters, Jun. 15, 1996, vol. 21, No. 12, pp. 881-883.

Kyunghwan OH et al., Continuous-wave oscillation of thulium-sensitized holmium-doped silica fiber laser, Optics Letters, Feb. 15, 1994, vol. 19, No. 4, pp. 278-280.

J.N. Carter et al., CW Diode-Pumped Operation of 1-97 um Thulium-Doped Fluorozirconate Fibre Laser, Electronics Letters, Apr. 26, 1990, vol. 26, No. 9, pp. 599-601.

* cited by examiner

SINGLE-FREQUENCY NARROW LINEWIDTH 2 µM FIBER LASER

CROSS-REFERENCE TO RELATED APPLICATIONS

This application claims benefit of priority under 35 U.S.C. 120 to and is a continuation in part of U.S. application Ser. No. 10/056,830 entitled "Rare-Earth Doped Phosphate-Glass Single-Mode Fiber Lasers" filed on Jan. 24, 2002, now U.S. Pat. No. 6,816,514, the entire contents of which are incorporated by reference.

GOVERNMENTAL RIGHTS

This invention was made with Government support under Contract NNL05AA94P awarded by NASA. The government has certain rights in this invention.

BACKGROUND OF THE INVENTION

1. Field of the Invention

This invention relates to fiber lasers and more specifically to a single frequency 2 µm fiber laser with narrow linewidth (<100 kHz and preferably <10 kHz) formed from glass fibers doped with Thulium and Holmium oxides and mixtures thereof.

2. Description of the Related Art

Rare-earth doped glass fiber lasers were first proposed in the 1960s and have received considerable attention in the 1980s for potential applications in optical communication. For laser emission to occur, the active fiber is placed inside a resonant cavity. The optical feedback can be provided simply by the reflectivity of the end facets, by mirrors, by distributed feedback Bragg (DFB) gratings, or by distributed Bragg reflectors (DBR), or by constructing a ring cavity structure. Laser emission occurs when the total gain overcomes the losses in the cavity. Hence, a minimum gain has to be achieved to reach the laser threshold condition. Typical fiber lasers lase in a great number of longitudinal modes in single transverse mode optic fibers, the so-called "single mode fibers". A "single frequency" fiber laser lases at a single longitudinal mode.

Most telecommunications applications operate at a wavelength of 1.55 µm to take advantage of the absorption characteristics of silica fiber. 1.55 µm single-frequency lasers using $Er^{3+}$ doped silica or silica-based fibers are described in G. A. Ball, W. W. Morey, W. H. Glenn, IEEE Photonics Technology Letters, Vol. 3, No. 7, July 1991; W. H. Loh et al. *Journal of Lightwave Technology*, Vol. 16, No. 1, pp. 114–118 January 1998; and U.S. Pat. Nos. 5,305,335 and 5,237,576.

2 µm lasers are important because of the high transmission properties in air at that wavelength. Applications such as seeder lasers, LIDAR, optical heterodyne systems, non-linear frequency conversion, coherent satellite communication, and distributed sensing require a robust 2 µm, e.g. typically 1.8–2.1 µm, single frequency narrow linewidth fiber laser. Single-frequency operation with a linewidth less than 100 kHz, preferably less than 10 kHz, provides both the resolution and long coherence needed by these applications. The 2 µm laser would preferably have sufficient output power without the need for a booster amplifier in order to maintain the high signal to noise ratio.

Current 2 µm single frequency laser technology is limited to solid state lasers, which are either configured to use an intracavity diode pumped etalon in conjunction with an external reference etalon (U.S. Pat. No. 5,457,706 to McGuckin) or as a non-planar ring oscillator (NPRO) in the presence of a sufficiently strong magnetic field (U.S. Pat. Nos. 4,578,793 and 5,043,996).

Current 2 µm fiber laser technology is limited to single transverse mode performance. J. Y. Allain et al *Electronics Letters* 25, 1660 (1989) reported on a single transverse mode laser operation at 1.88 and 2.35 µm using a 150 cm long thulium doped fluorozirconate fiber. J. N. Carter et al *Electronics Letters* 26, 599 (1990) reported on a cw thulium doped fiber laser that emits at 1.97 µm using the $^3H_4$-$^3H_6$ transition in a multimode fluoride glass fiber. Cladding pumped Tm doped silica fiber laser at 2 µm were reported by R. A. Hayward et al *Electronics Letters*, Vol. 36, No. 8, pp. 711 (2000), S. Jackson et al, *Journal of Optical Society of America B*, Vol. 16, No. 12, pp. 2178 (1999), *Optics Letters*, Vol. 23, No. 18, pp. 1462 (1998), and W. A. Clarkson et al, *Optics Letters* Vol. 27, No. 22, pp. 1989, (1989). Mode-locked thulium fiber laser was described by R. C. Sharp et al *Optics Letters*, Vol. 21, No. 12, pp. 881, (1996). Q-switched high peak power operation at 2 µm in Tm doped silica fiber was reported by A. F. El-Sherif et al *Optics Letter*, Vol. 28, No. 1, pp. 22, (2003). Fiber laser operation in thulium sensitized holmium doped silica fibers were reported by K. Oh, et al *Optics Letters*, Vol. 19, No. 4, pp. 278 (1994), C. Ghisler et al *IEEE Journal of Quantum Electronics*, Vol. 31, No. 11, pp. 1877, (1995), and S. D. Jackson et al *IEEE J. of Quantum Electronics*, Vol. 34, No. 9, pp. 1578 (1998).

SUMMARY OF THE INVENTION

The present invention provides a compact single frequency, single-mode 2 µm fiber laser with narrow linewidth.

The 2 µm fiber laser includes a gain fiber formed of a low phonon energy glass host, either fluoride based or an oxide-based multi-component glass such as germanate or tellurite, that is doped with triply ionized rare-earth thulium or holmium oxide or mixtures thereof. Erbium and ytterbium may be used to absorb and transfer pump energy to the active ions. Fiber gratings are formed in sections of passive silica fiber and fused to the gain fiber to form the resonant cavity. A doping concentration of 0.5 to 15 wt. % for either thulium or holmium oxides or mixtures thereof produces adequate gain, hence output power levels for fiber lengths less than 5 cm and preferably less than 3 cm to enable stable single-frequency operation. Formation of the gratings in passive silica fiber both facilitates splicing to other optical components and reduces noise thus improving linewidth. The pump can be a multimode or single mode laser. In the case of a single mode laser, the use of a polarization maintaining (PM) fiber in the pump source further improves wavelength stability, linewidth and vibration/acoustic sensitivity.

In another embodiment, the gain fiber is a polarization maintaining (PM) fiber, which reduces the noise level in the laser and improves output power stability. As a result of their specific local environment, the active ions experience an anisotropy that leads to polarization dependent gain, which means that the gain spectra for two different polarization components are not the same. Combining polarization selective feedback with a polarization maintaining active fiber reduces the low frequency noise that results from random polarization fluctuations inside the laser cavity.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
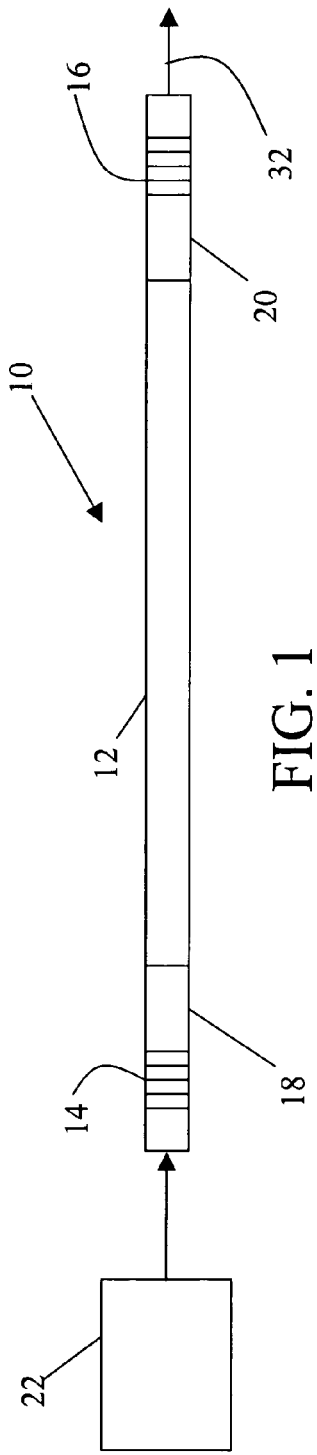
FIG. 1 is a diagram of a single-frequency fiber laser in accordance with the present invention.

The present invention provides a compact single frequency, single-mode 2 μm fiber laser with narrow linewidth, less than 100 kHz and preferably less than 10 kHz. As shown in FIGS. 1 through 4, a 2 μm fiber laser 10 includes a single mode gain fiber 12 formed of a low phonon energy glass host doped with triply ionized rare-earth thulium or holmium oxide or mixtures thereof. Erbium or ytterbium dopants may also be used to absorb and then transfer pump energy to the active ions. The low phonon energy glass host is selected from either an oxide-based multi-component germanate or tellurite glasses or a fluoride based glass. These host glasses have sufficiently low phonon energy to slow down the multi-phonon relaxation process. Narrowband and broadband fiber gratings 14 and 16, respectively, are formed in sections of passive silica fiber 18 and 20 and fused to the ends of gain fiber 12 to form a resonant cavity that provides the feedback necessary to sustain laser operation. The reflectivity of the broadband grating 16 should be as close to 100% as possible. The reflectivity of the narrowband grating 14 is less than 100%, suitably 30–90% depending upon the pump power and target output power, such that power can be removed from the cavity. Alternately, the broadband grating could be used to output couple the laser energy.

Figure 5A:
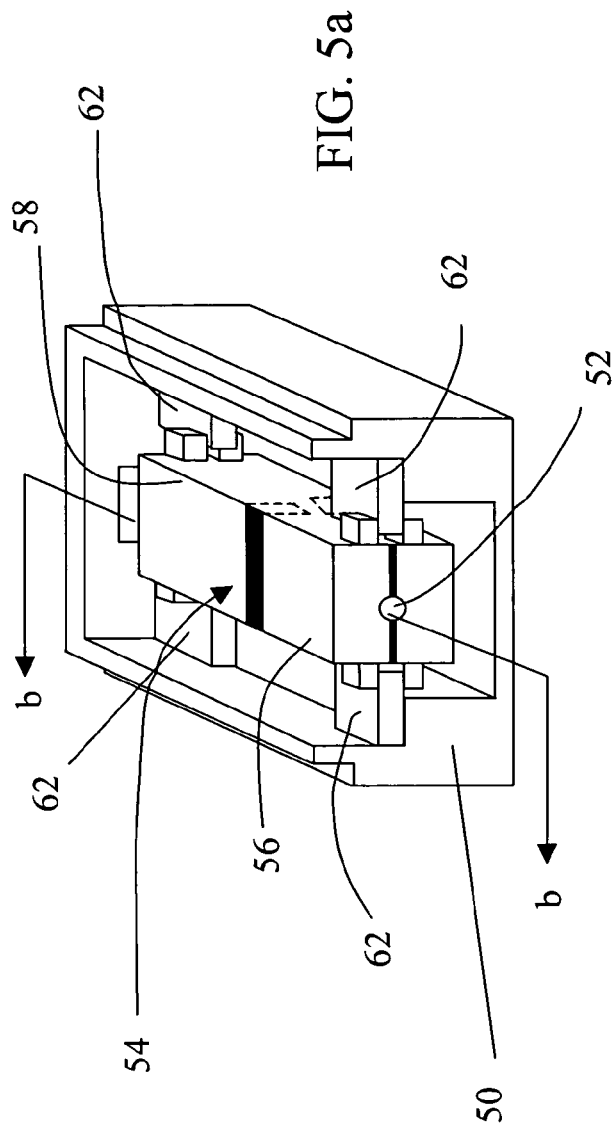
FIGS. 5a and 5b are diagrams of a packaged single-frequency fiber laser including temperature control and vibration isolation.
Figure 5B:
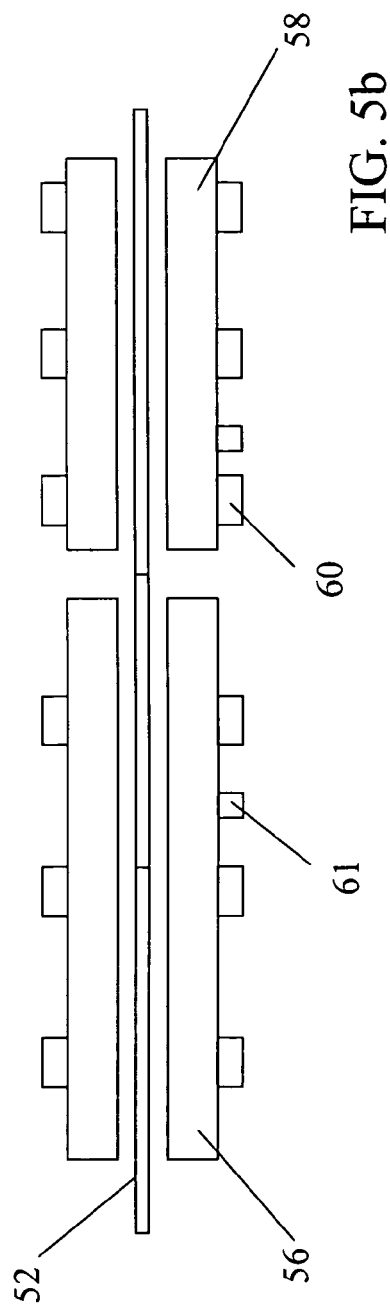

The low phonon energy glasses (germanate, tellurite and fluoride) exhibit high quantum efficiency for the 2 μm transition. These glasses also support the high doping concentrations required to provide sufficient gain in short fiber lengths to achieve both single frequency operation and narrow linewidths. The holmium oxide ($Ho_2O_3$) or thulium oxide ($Tm_2O_3$) doping concentration is 0.5–15 wt. %. If co-doped, the thulium/holmium concentration can range from 0.5 to 15 wt. %. The formation of the gratings in passive silica fiber rather than the gain fiber reduces ASE noise, which improves linewidth. As will be described with reference to FIGS. 5a and 5b, thermal stabilization and vibration isolation of the gain fiber and gratings and the use of a polarization maintaining (PM) fiber in the pump source further improve and maintain linewidth in commercial applications.

Figure 2:
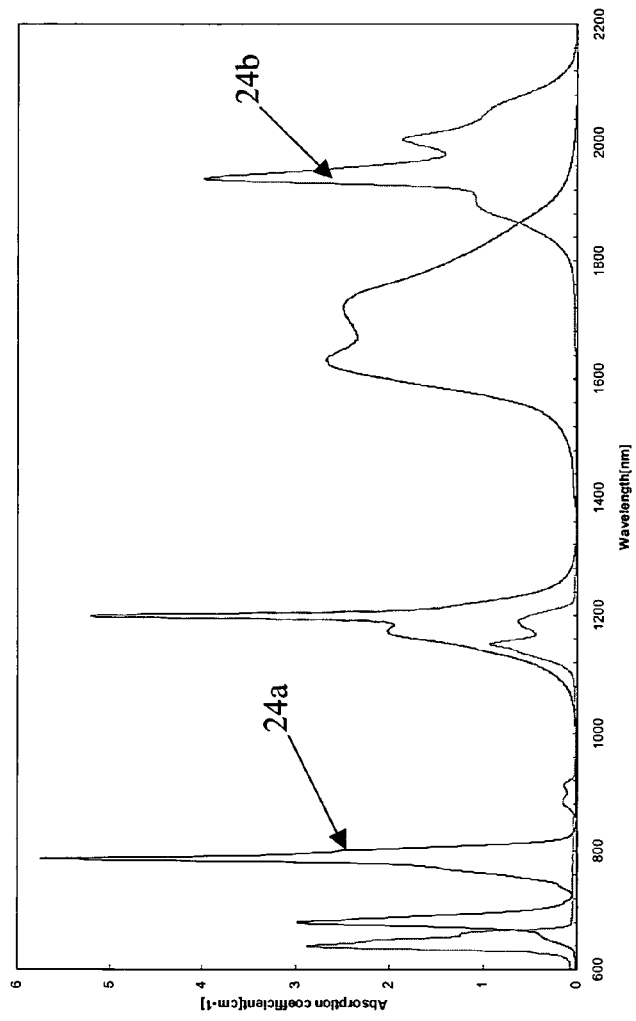
FIG. 2 is a plot of the absorption spectra of thulium and holmium doped glasses.

A source of pump radiation 22, e.g. a single-mode or multi-mode laser diode, illuminates gain fiber 12 at a wavelength, typically 800 nm, within the absorption band. As shown in FIG. 2, the absorption band 24a of triply ionized thulium occurs from 750 to 820 nm. The pump wavelength can be around 1.2 μm and 1.7 μm to excite Thulium from $^3H_6$ state to $^3H_5$ and $^3F_4$ levels. The absorption band 24b of triply ionized holmium occurs from 1800 to 2100 nm. The pump wavelength can be around 1800 μm and 2100 μm to excite Holmium from $^5I_8$ to $^5I_7$ levels. Typically one excites thulium ions, which in turn transfers energy to the holmium ions. The pump wavelength can also be shifted to other wavelengths to excite Yb and Er when these ions are doped into the host. Pumping of the doped glass populates the thulium upper level creating a population inversion. Spontaneous emission catalyzes the stimulated emission of the thulium (holmium) ions in the upper level over a range of 1800 to 2000 nm (1900 to 2200 nm). The emission peak of thulium (holmium) occurs at a wavelength of approximately 1800 nm (2080 nm).

Figure 3:
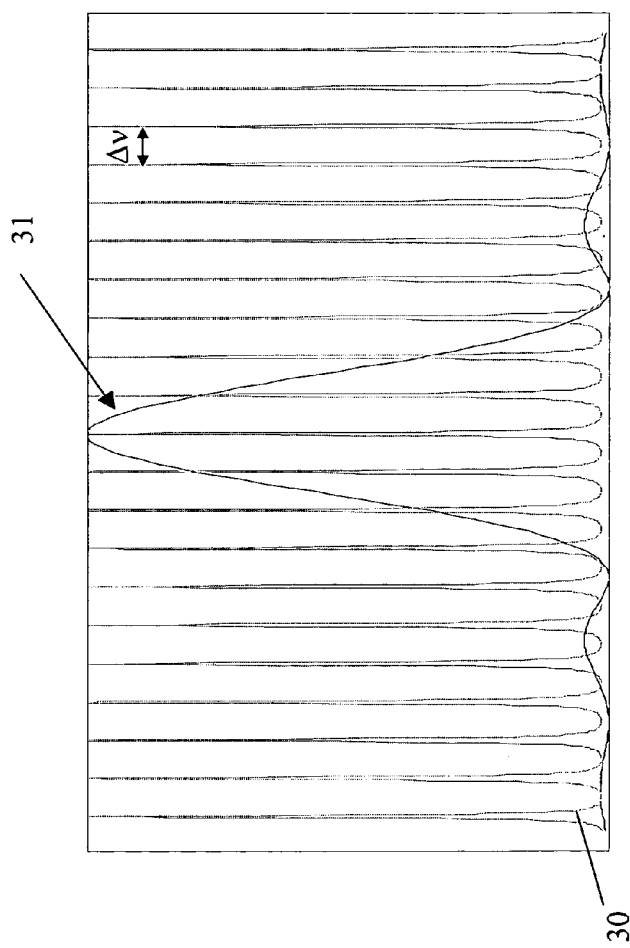
FIG. 3 is a diagram of the longitudinal mode spacing and grating bandwidth that produce a single-frequency output.

Laser emission occurs when the total gain produced by stimulated emission overcomes the losses in the cavity. The gain profile of thulium and holmium and the geometry of the resonant cavity create preferential feedback so that laser emission only occurs at one or more discrete wavelengths. As shown in FIG. 3, an ultra-short cavity, less than 5 cm and preferably less than 3 cm, produces a mode spacing $\Delta v$ that is at least comparable to and preferably larger than the linewidth 30 (full-width half-max of the peak) of the narrowband grating (less than 0.07 nm), which together with the gain spectrum 31 limits laser emission to a single longitudinal mode 32. Therefore, a very high gain per unit length is needed in order to achieve single frequency fiber laser operation if a linear cavity is used. The gain per unit length required here typically exceeds normally achievable value. Glasses with high doping concentration and fibers with high gain per unit length are required. In addition, a fusion splicing technique with a short working distance between the active fiber and the grating fibers is needed.

To achieve single-frequency performance the glass host must support high Thulium and Holmium doping concentrations to realize the necessary gain per unit length. The doping concentrations are at least 0.5 wt. % and typically about 1–8 wt. %. Therefore, glasses with good rare-earth ion solubility must be selected.

Suitable oxide-based multi-component laser glasses contain either a germanate-oxide ($GeO_2$) or tellurite-oxide ($TeO_2$) network former, one or more glass network modifiers including alkaline-earth oxides and transition metal oxides MO such as BaO, CaO, MgO, SrO, ZnO, PbO and mixtures thereof and/or alkali metal oxides $R_2O$ such as $Na_2O$, $Li_2O$ and $K_2O$ and mixtures thereof, and one or more glass network intermediators $L_2O_3$ such as $Y_2O_3$, $La_2O_3$, $Al_2O_3$, $B_2O_3$, $WO_3$ and mixtures thereof. The modifier modifies the glass network, thereby reducing its melting temperature and creating additional dopant sites. The intermediator bridges some of the bonds in the network thereby increasing the network's strength and chemical durability without raising the melting temperature appreciably. The glass host composition by weight percent is 30 to 85% network former, 2 to 50% modifier including 0–10% MO and 0–20% $R_2O$, and 0.2 to 50% intermediator. Typically, the intermediator is at least 2 wt. % and suitably 10 wt. % and the total modifier is at least 2 wt. % and suitably 25 wt. %.

Figure 4:
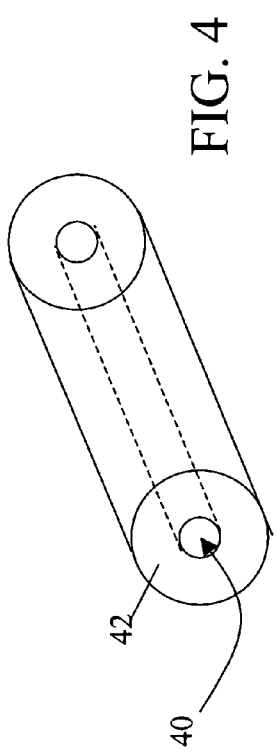
FIG. 4 is a sectional view of the gain fiber.

As shown in FIG. 4, the fiber core 40 is made up of the glass host doped with high concentrations of thulium or holmium oxide or mixtures thereof. The cladding layer(s) 42 are formed from the same glass host, although the exact composition may vary somewhat from the core glass, and are typically undoped. Numerous glass compositions were characterized for thermal properties (crystallization, expansion coefficient, transition and softening temperatures, core-to-clad similarity), chemical durability, ability to host high Tm (Ho) doping concentrations without quenching, spectroscopic properties (maximum emission cross-section at 2.0 microns), linewidth (maximum breadth at 2.0 microns) and refractive index to determine a range of wt. % for each ingredient that are acceptable. Suitable glass compositions for germinate host glasses are illustrated in Tables 1 and 2 and tellurite host glasses are illustrated in Table 3, respectively.

TABLE 1

CG-S-3

|      | GeO   | Al$_2$O$_3$ | BaO   | Na$_2$O | Ho$_2$O$_3$ | Total |
|------|-------|-------------|-------|---------|-------------|-------|
| Wt % | 61.82 | 7.36        | 17.29 | 6.71    | 6.82        | 100   |

DG-S-1

|      | GeO   | Al$_2$O$_3$ | BaO   | Na$_2$O | La$_2$O$_3$ | Total |
|------|-------|-------------|-------|---------|-------------|-------|
| Wt % | 62.41 | 7.43        | 17.46 | 6.77    | 5.93        | 100   |

DG-S-4

|      | GeO   | Al$_2$O$_3$ | BaO   | Na$_2$O | La$_2$O$_3$ | Total |
|------|-------|-------------|-------|---------|-------------|-------|
| Wt % | 62.41 | 7.43        | 17.46 | 6.77    | 5.93        | 100   |

DG-S-6

|      | GeO   | Al$_2$O$_3$ | BaO   | Na$_2$O | La$_2$O$_3$ | Total |
|------|-------|-------------|-------|---------|-------------|-------|
| Wt % | 62.41 | 7.43        | 17.46 | 6.77    | 5.93        | 100   |

TABLE 2

|         | GeO$_2$ | Al$_2$O$_3$ | BaO   | CaO  | MgO  | Na$_2$O | Li$_2$O | K$_2$O | La$_2$O$_3$ | Total  |
|---------|---------|-------------|-------|------|------|---------|---------|--------|-------------|--------|
| CG-S-1  | 65.50   | 8.00        | 12.50 |      |      | 12.00   |         |        | 2.00        | 100.00 |
| G-S-1   | 65.50   | 8.00        | 24.50 |      |      | 0.00    |         |        | 2.00        | 100.00 |
| G-S-2   | 65.50   | 8.00        | 18.00 |      |      | 6.50    |         |        | 2.00        | 100.00 |
| G-S-3   | 65.50   | 8.00        | 12.50 |      |      | 12.00   |         |        | 2.00        | 100.00 |
| G-S-4   | 65.50   | 8.00        | 6.50  |      |      | 18.00   |         |        | 2.00        | 100.00 |
| G-S-5   | 65.50   | 8.00        | 0.00  |      |      | 24.50   |         |        | 2.00        | 100.00 |
| G-S-6   | 65.50   | 8.00        | 6.50  |      |      | 18.00   |         |        | 2.00        | 100.00 |
| G-S-7   | 65.50   | 6.00        | 6.50  |      |      | 20.00   |         |        | 2.00        | 100.00 |
| G-S-8   | 65.50   | 4.00        | 6.50  |      |      | 22.00   |         |        | 2.00        | 100.00 |
| G-S-9   | 65.50   | 2.00        | 6.50  |      |      | 24.00   |         |        | 2.00        | 100.00 |
| G-S-10  | 61.50   | 6.00        | 6.50  |      |      | 24.00   |         |        | 2.00        | 100.00 |
| G-S-11  | 57.50   | 6.00        | 6.50  |      |      | 28.00   |         |        | 2.00        | 100.00 |
| G-S-12  | 65.50   | 6.00        |       | 6.50 |      | 20.00   |         |        | 2.00        | 100.00 |
| G-S-13  | 65.50   | 6.00        |       |      | 6.50 | 20.00   |         |        | 2.00        | 100.00 |
| G-S-14  | 61.50   | 6.00        | 6.50  | 4.00 |      | 20.00   |         |        | 2.00        | 100.00 |
| G-S-15  | 61.50   | 6.00        | 6.50  |      |      |         | 24.00   |        | 2.00        | 100.00 |
| G-S-16  | 61.50   | 6.00        | 6.50  |      |      |         |         | 24.0   | 2.00        | 100.00 |
| G-S-17  | 57.5    | 6           | 10.5  |      |      | 24      |         |        | 2           | 100.00 |
| G-S-18  | 53.5    | 6           | 14.5  |      |      | 24      |         |        | 2           | 100.00 |
| G-S-19  | 60      | 6           | 8     |      |      | 24      |         |        | 2           | 100.00 |
| G-S-20  | 60      | 6           | 6.5   |      |      | 25.5    |         |        | 2           | 100.00 |
| G-S-21  | 60      | 6           | 6.5   |      |      | 20      |         | 5.5    | 2           | 100.00 |
| G-S-22  | 60      | 6           | 4.5   | 2    |      | 20      |         | 5.5    | 2           | 100.00 |
| G-S-23  | 60      | 7.5         | 6.5   |      |      | 24      |         |        | 2           | 100.00 |

TABLE 3

|       | Na$_2$O | Al$_2$O$_3$ | B$_2$O$_3$ | TeO$_2$ | Tm$_2$O$_3$ | Total wt % |
|-------|---------|-------------|------------|---------|-------------|------------|
| TB-T1 | 7.4     | 8.11        | 8.31       | 76.18   |             | 100        |
| TB-T2 | 7.38    | 8.09        | 8.29       | 75.99   | 0.25        | 100        |
| TB-T3 | 7.36    | 8.07        | 8.27       | 75.8    | 0.5         | 100        |
| TB-T4 | 7.25    | 7.95        | 8.15       | 74.69   | 1.96        | 100        |
| TB-T5 | 7.18    | 7.87        | 8.07       | 73.96   | 2.92        | 100        |
| TB-T6 | 7.05    | 7.72        | 7.91       | 72.55   | 4.77        | 100        |
| TB-T7 | 6.92    | 7.58        | 7.76       | 71.2    | 6.54        | 100        |

TABLE 3-continued

|       | K$_2$O | Li$_2$O | WO$_3$ | TeO$_2$ | Tm$_2$O$_3$ | Total wt % |
|-------|--------|---------|--------|---------|-------------|------------|
| TW-T1 | 4.33   | 1.38    | 35.46  | 58.58   | 0.25        | 100        |
| TW-T2 | 2.33   | 2.58    | 35.67  | 58.92   | 0.5         | 100        |
| TW-T3 | 2.31   | 2.57    | 35.49  | 58.63   | 1           | 100        |
| TW-T4 | 2.29   | 2.54    | 35.14  | 58.05   | 1.98        | 100        |

Based on this empirical data, a first exemplary embodiment of a suitable core laser glass may comprise by weight percent:

45 to 70 GeO$_2$;

0.5 to 20 L$_2$O$_3$ selected from Al$_2$O$_3$, B$_2$O$_3$ and La$_2$O$_3$ and mixtures thereof;

2 to 20 MO selected from BaO, CaO and MgO and mixtures thereof;

2 to 30 R$_2$O selected from Na$_2$O, Li$_2$O, and K$_2$O and mixtures thereof; and 0.5–15 Ho$_2$O$_3$, Tm$_2$O$_3$ and mixtures thereof.

Based on this empirical data, a second exemplary embodiment of a suitable core laser glass may comprise by weight percent:

45 to 85 TeO$_2$;

0.5 to 15 L$_2$O$_3$ selected from Al$_2$O$_3$, B$_2$O$_3$ and La$_2$O$_3$ and mixtures thereof;

0.5 to 20 R$_2$O is selected from Na$_2$O, Li$_2$O, and K$_2$O and mixtures thereof; and 0.5–15 Ho$_2$O$_3$, Tm$_2$O$_3$ and mixtures thereof.

Based on this empirical data, a third exemplary embodiment of a suitable core laser glass may comprise by weight percent:

45 to 85 TeO$_2$;

10 to 45 WO$_3$; and 0.5 to 20 R$_2$O selected from Na$_2$O, Li$_2$O, and K$_2$O and mixtures thereof; and 0.5–15 Ho$_2$O$_3$, Tm$_2$O$_3$ and mixtures thereof.

In another embodiment, the gain fiber 12 is a polarization maintaining (PM) fiber, which reduces the noise level in the laser and improves output power stability. As a result of their specific local environment, the active ions experience an anisotropy that leads to polarization dependent gain, which means that the gain spectra for two different polarization components are not the same. Combining polarization selective feedback with a polarization maintaining active fiber reduces the low frequency noise that results from random polarization fluctuations inside the laser cavity.

The subclass of multi-component glasses has a much lower softening temperature (<600° C.) than silica (>1200° C.), which greatly simplifies the fiber drawing process and supports higher doping concentrations but complicates the process of fusion splicing to silica fiber. A quality fusion splice should exhibit low optical loss (<0.3 dB), low back reflection loss (<−50 dB) and good tensile strength (>100 g). A standard silica-to-silica fusion splice degrades the multi-component fiber. Instead an asymmetric process that softens only the multi-component fiber is employed as described in co-pending U.S. application Ser. No. 09/963,727 entitled "Method of Fusion Splicing Silica Fiber with Low-Temperature Multi-Component Glass Fiber" filed on Sep. 26, 2001, which is incorporated by reference. To reduce back-reflection, an angle splicing process in which the silica fiber is angle cleaved, the multi-component fiber square cleaved and a matched angle formed in-situ may be employed as described in co-pending U.S. application Ser. No. 10/374, 001 entitled "Method of Angle Fusion Splicing Silica Fiber with Low-Temperature Non-Silica Fiber" filed on Feb. 25, 2003 the entire contents of which are incorporated by reference.

As shown in FIGS. 6a and 6b, the single mode 2 μm laser is placed inside a package 50 that provides thermal and vibration isolation. The fiber chain 52 is placed in a mounting fixture 54 having first and second thermally isolated sections 56 and 58 for supporting the narrowband and broadband fiber gratings 14 and 16 respectively. The gain fiber is supported in either the first or second section or in a third isolated section (not shown in this embodiment). Resistive heaters 60 thermistors 61 are mounted on the first and second sections and independently controlled to match the wavelengths of narrowband and broadband gratings.

The mounting fixture 54 is connected to the laser external package 50 through connectors 62 made of compliant material with relatively small Young modulus and a small thermal conductivity coefficient. The mounting fixture 54 containing the fiber chain and more specifically the first and second thermally isolated sections 56 and 58 are independently heated above room temperature and temperature stabilized. The connection to the external package 50 with the compliant connectors 62 provides simultaneously good mechanical and thermal stability to the laser itself. This is necessary for stable laser output.

Figure 6:
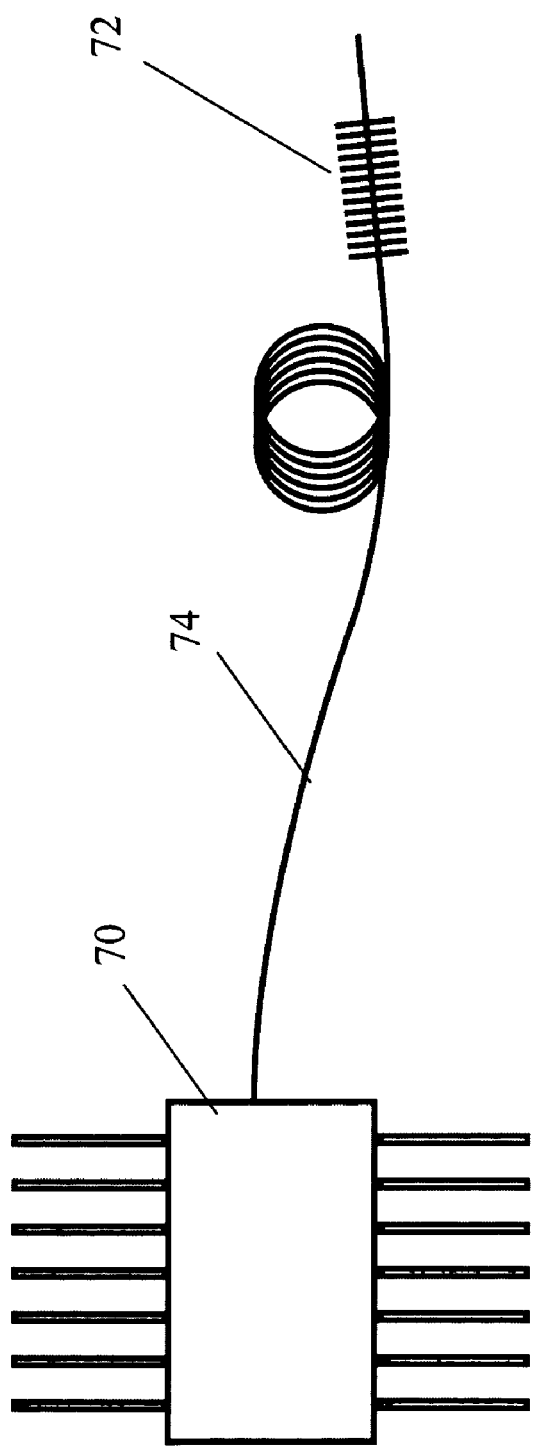
FIG. 6 is a diagram of a pump source with a PM fiber.

As described above in connection with FIG. 1, the optical cavity must be pumped to induce lasing. As shown in FIG. 6, a single-mode semiconductor pump diode 22 includes a semiconductor chip 70 and a grating 72 separated by about a meter of passive fiber 74. The grating locks the pump's output to a wavelength. In most applications, the OTS pump diode is adequate. Since, however, very narrow linewidth lasers have a number of applications in sensing, in particular acoustic sensing, it is important to ensure very low frequency and phase noise at low frequencies. The phase noise is particularly sensitive to polarization fluctuations in the pump fiber. Single mode semiconductor pump lasers emit highly polarized light. The polarization of the pump light is, however, sensitive to birefringence fluctuations in the pump fiber if PM fiber is not employed. The fiber 74 that leads from the diode 70 to the fiber laser is typically longer than 1 m and any vibration and acoustic pickup in this fiber leads to small changes in the pump light polarization. Due to the anisotropy of the active ions, this leads to additional noise in the fiber laser output. The effect is more pronounced in the phase noise as in the intensity noise. Ronnekleiv has already pointed out that this vibration and pressure sensitivity could be largely reduced if one would use a depolarized pump source. ["Frequency and Intensity Noise of Single Frequency Fiber Bragg Grating Lasers", by Erlend Ronnekleiv, Optical Fiber Technology, 7, 206–235 (2001)—page 227, second paragraph]. Placing a depolarizer between the highly-polarized pump laser and the fiber laser is one way to reduce the acoustic pickup in the lead fiber.

Using polarization maintaining (PM) fiber 74 from the pump diode 70 to the fiber laser avoids the costly depolarizer and has the same effect. Due to the birefringence in polarization maintaining fiber, the polarization state of the pump light will not change when the fiber is subject to mechanical vibrations or acoustic pressure waves. The polarization whose stimulated emission cross section of the gain fiber is higher is aligned to the orientation of the operating polarization of the narrow-band fiber Bragg grating. Experiments have shown that using PM fiber in the pump lead greatly reduces the phase noise of the fiber laser output and the sensitivity to low frequency external noise.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A fiber laser, comprising:
   A gain fiber less than 5 cm in length including,
      A core formed from a glass host selected from germanate, tellurite or fluoride, said glass host being doped with 0.5–15 wt. % of thulium or holmium oxide or mixtures thereof; and
      A cladding formed from the same glass host;
   A narrowband grating having a linewidth and a broadband grating at opposite ends of the fiber that define an optical resonant cavity; and
   A source of pump radiation that illuminates the fiber to excite the dopant ions and provide gain;
   the length of the resonant cavity producing a mode spacing that is comparable with the narrowband grating's linewidth so that the dopant ions lase at a single longitudinal mode, said fiber laser outputting a single-frequency signal having a center wavelength between approximately 1.8 μm and 2.1 μm with a linewidth less than 100 kHz.

2. The fiber laser of claim 1, wherein the glass is doped with 1–8 wt. % thulium or holmium oxide.

3. The fiber laser of claim 1, wherein the linewidth of the single-frequency signal is less than 10 kHz.

4. The fiber laser of claim 1, wherein the narrowband and broadband gratings are formed in sections of passive silica fiber that are fusion spliced to the ends of the gain fiber.

5. The fiber laser of claim 1, wherein the pump includes a section of polarization maintaining fiber.

6. The fiber laser of claim 1, wherein the multi-component glass includes the following ingredients by weight percentages,
   a network former of 30 to 85 percent, where the network former is selected from germanate-oxide ($GeO_2$) or tellurite-oxide ($TeO_2$),
   a glass intermediator $L_2O_3$ of 0.5 to 50 percent, where $L_2O_3$ is selected from $Al_2O_3$, $B_2O_3$, $Y_2O_3$, $La_2O_3$, $WO_3$ and mixtures thereof, and a glass modifier of 2 to 50 percent including (a) MO of 0 to 20 percent, where MO is selected from BaO, BeO, MgO, SrO, CaO, ZnO, PbO, and mixtures thereof, and (b) $R_2O$ of 0 to 20 percent, where $R_2O$ is selected from $Na_2O$, $Li_2O$ and $K_2O$ and mixtures thereof.

7. The fiber laser of claim 6, wherein the glass includes by weight percentages,
45 to 70 $GeO_2$;
0.5 to 20 $L_2O_3$;
2 to 20 MO; and
2 to 30 $R_2O$,
wherein $L_2O_3$ is selected from $Al_2O_3$, $B_2O_3$ and $La_2O_3$ and MO is selected from BaO, CaO and MgO.

8. The fiber laser of claim 6, wherein the glass includes by weight percentages,
45 to 85 $TeO_2$;
0.5 to 15 $L_2O_3$; and
0.5 to 20 $R_2O$,
wherein $L_2O_3$ is selected from $Al_2O_3$, $B_2O_3$ and $La_2O_3$.

9. The fiber laser of claim 6, wherein the glass includes by weight percentages,
45 to 85 $TeO_2$;
10 to 45 $WO_3$; and
0.5 to 20 $R_2O$.

10. The fiber laser of claim 1, wherein the gain fiber is less than 5 cm in length.

11. The fiber laser of claim 1, wherein the gain fiber is a polarization maintaining (PM) fiber.

12. The fiber laser of claim 11, wherein the polarization whose stimulated emission cross section of the gain fiber is higher is aligned to the orientation of the operating polarization of the narrow-band fiber Bragg grating.

13. The fiber laser of claim 11, wherein the mode spacing is greater than 0.07 nm.

14. The fiber laser of claim 1, wherein the narrowband grating has a linewidth less than 0.07 nm and the broadband grating has a linewidth between 0.07 nm and 0.4 nm.

15. A fiber laser, comprising:
A gain fiber less than 5 cm in length including,
A cladding formed from fluoride, germanate or tellurite glass host; and
A single mode core formed from the same glass host doped with 0.5–15% thulium or holmium oxide or mixtures thereof;
A passive silica fiber having a narrowband grating formed therein and fused at one end of the gain fiber;
A passive silica fiber having a broadband grating formed therein and fused at the other end of the gain fiber; and
A source of pump radiation that illuminates the fiber so that said fiber outputs a single-frequency signal having a center wavelength at approximately 2 μm.

16. The fiber laser of claim 15, wherein the glass is doped with 1–8 wt. % thulium or holmium oxide.

17. The fiber laser of claim 15, wherein the glass includes by weight percentages,
a network former of 30 to 85 percent, where the network former is selected from germanate-oxide ($GeO_2$) or tellurite-oxide ($TeO_2$),
a glass intermediator $L_2O_3$ of 0.5 to 50 percent, where $L_2O_3$ is selected from $Al_2O_3$, $B_2O_3$, $Y_2O_3$, $La_2O_3$, $WO_3$ and mixtures thereof, and
a glass modifier of 2 to 50 percent including (a) MO of 0 to 20 percent, where MO is selected from BaO, BeO, MgO, SrO, CaO, ZnO, PbO, $K_2O$, $Li_2O$ and mixtures thereof, and (b) $R_2O$ of 0 to 20 percent, where $R_2O$ is selected from $Na_2O$, $Li_2O$ and $K_2O$ and mixtures thereof.

18. The fiber laser of claim 15, wherein the source of pump radiation and/or the gain fiber includes a polarization maintaining (PM) fiber.

19. The fiber laser of claim 15, wherein the narrowband grating has a linewidth less than 0.07 nm and the broadband grating has a linewidth between 0.07 nm and 0.4 nm, said narrowband and broadband gratings forming a resonant cavity less than 5 cm in length with a mode spacing that is greater than 0.07 nm so that said single-frequency signal has a linewidth less than 10 kHz.

20. A fiber laser, comprising:
A gain fiber less than 5 cm in length including,
A core formed from an oxide-based multi-component glass host including by weight percentage a network former of 30 to 85 percent selected from germanate-oxide ($GeO_2$) or tellurite-oxide ($TeO_2$), a glass intermediator $L_2O_3$ of 0.5 to 50 percent selected from $Al_2O_3$, $B_2O_3$, $Y_2O_3$, $La_2O_3$, $WO_3$ and mixtures thereof, and a glass modifier of 2 to 50 percent including (a) MO of 0 to 20 percent selected from BaO, BeO, MgO, SrO, CaO, ZnO, PbO, $K_2O$, $Li_2O$ and mixtures thereof, and (b) $R_2O$ of 0 to 20 percent selected from $Na_2O$, $Li_2O$ and $K_2O$ and mixtures thereof, said glass host being doped with 0.5–15 weight percent thulium or holmium oxide or mixtures thereof; and
A cladding formed from the same glass host;
A narrowband grating at one end of the fiber;
A broadband grating at the other end of the fiber; and
A source of pump radiation that illuminates the fiber so that the dopant oxide ions lase at a single longitudinal mode and said fiber outputs a single-frequency signal having a center wavelength at approximately 2 μm.

21. The fiber laser of claim 20, wherein the narrowband and broadband gratings are formed in sections of passive silica fiber that are fusion spliced to the ends of the gain fiber.

22. The fiber laser of claim 21, wherein the narrowband grating has a linewidth less than 0.07 nm and the broadband grating has a linewidth between 0.07 nm and 0.4 nm, said narrowband and broadband gratings forming a resonant cavity less than 5 cm in length with a mode spacing that is greater than 0.07 nm so that said single-frequency signal has a linewidth less than 10 kHz.

23. The fiber laser of claim 20, wherein the single-mode signal has a linewidth of less than 10 kHz.

24. The fiber laser of claim 20, wherein the glass is doped with 1–8 wt. % thulium or holmium oxide.

25. The fiber laser of claim 20, wherein the glass includes by weight percentages,
45 to 70 $GeO_2$;
0.5 to 20 $L_2O_3$;
2 to 20 MO; and
2 to 30 $R_2O$,
wherein $L_2O_3$ is selected from $Al_2O_3$, $B_2O_3$, $La_2O_3$ and MO is selected from BaO, CaO and MgO.

26. The fiber laser of claim 20, wherein the glass includes by weight percentages,
45 to 85 $TeO_2$;
0.5 to 15 $L_2O_3$; and
0.5 to 20 $R_2O$,
wherein $L_2O_3$ is selected from $Al_2O_3$, $B_2O_3$, $La_2O_3$.

27. The fiber laser of claim 20, wherein the glass includes by weight percentages,
45 to 85 $TeO_2$;
10 to 45 $WO_3$; and
0.5 to 20 $R_2O$.

* * * * *